UNITED STATES PATENT OFFICE.

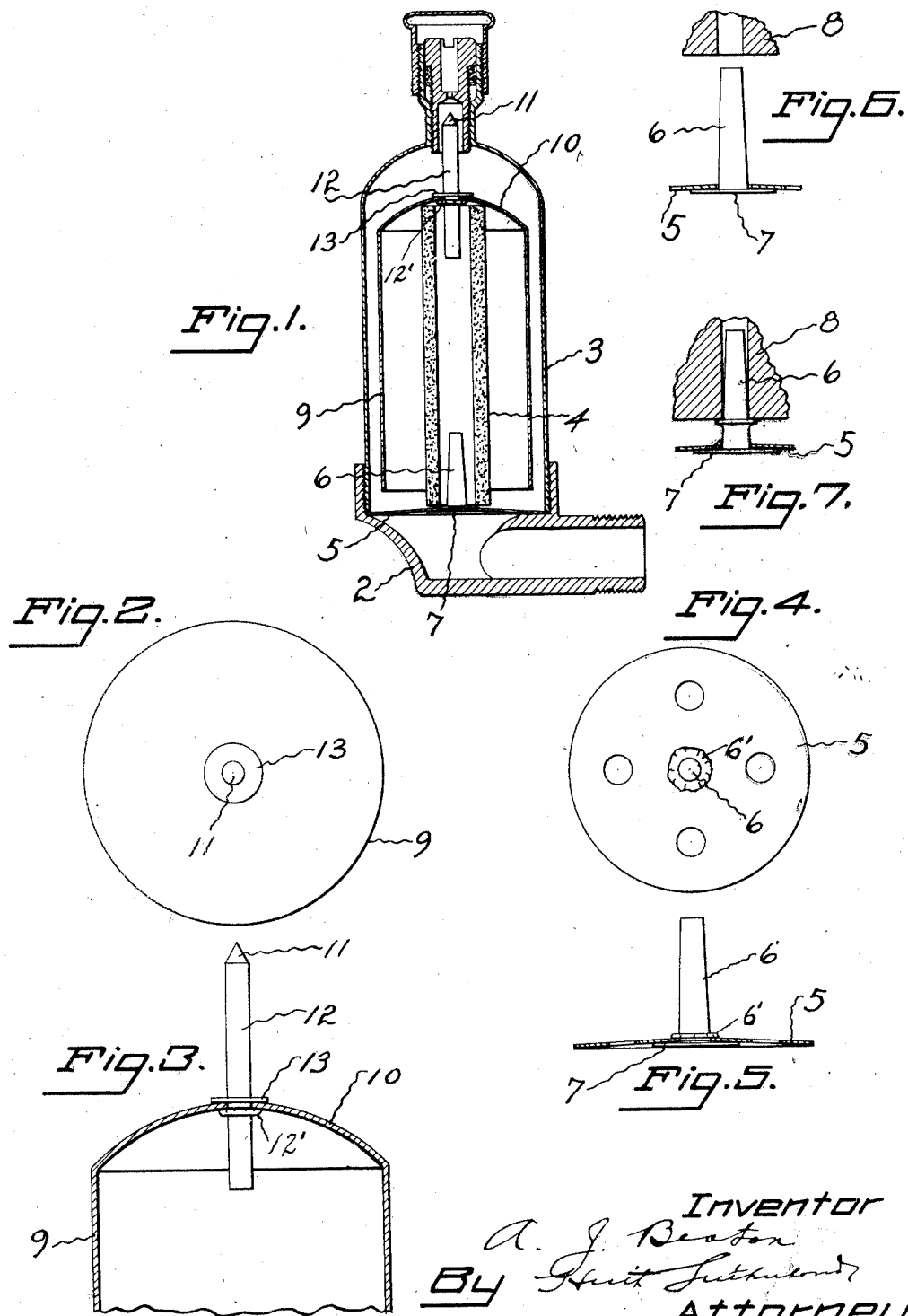

ALLAN J. BEATON, OF NEW BRITAIN, CONNECTICUT, ASSIGNOR TO THE A. J. BEATON MANUFACTURING COMPANY, OF NEW BRITAIN, CONNECTICUT, A CORPORATION OF CONNECTICUT.

AIR-VALVE DEVICE.

1,341,101.   Specification of Letters Patent.   Patented May 25, 1920.

Application filed October 9, 1919. Serial No. 329,447.

*To all whom it may concern:*

Be it known that I, ALLAN J. BEATON, a citizen of the United States, residing at New Britain, in the county of Hartford and State of Connecticut, have invented certain new and useful Improvements in Air-Valve Devices, of which the following is a specification.

This invention relates to what I shall for convenience term an "air valve device." I use the title as noted, for convenience and for the further reason that the improvement is of especial advantage when employed in conjunction with or incorporated in an "air valve" as it is known, these devices usually forming part of the equipment found in steam, hot water heating and other systems. I have several objects in view, among the principal of them being the provision of simple and efficient means by which a stud or pin may be held in proper position in a thoroughly secure and stable manner. The invention comprises other features of novelty and advantage which with the foregoing will be set forth at length in the following description wherein I will set forth in detail that form of embodiment of the invention which I have selected for illustration in the drawings accompanying and forming part of the present specification. I am not restricted to this particular disclosure. I may in fact depart therefrom in several particulars within the scope of the invention defined by the claims following said description.

Referring to said drawings:

Figure 1 is a longitudinal, central sectional view of an air valve involving the invention.

Fig. 2 is a top plan view of a float.

Fig. 3 is a vertical sectional view of the upper portion of said float.

Fig. 4 is a top plan view of a float support.

Fig. 5 is a sectional elevation of said float support.

Figs. 6 and 7 are sectional details hereinafter described.

Like characters refer to like parts throughout the several views which are on different scales.

In Letters Patent No. 1,264,597 granted to me April 30, 1918, and to which reference may be had, is represented what I term in said patent an "air valve device."

The invention as may be inferred, is susceptible as an illustration, of incorporation with advantageous results, in this device or one practically like it; as a matter of fact the invention is capable of general use as will be clear from the statements already made. I will briefly describe the air valve device shown in the accompanying drawings which is in a measure, like that of my prior patent and at the same time will set forth the invention.

There is a base as 2 surmounted by the shell 3 detachably connected as by screw-threading, in the manner practically illustrated in my prior patent. Within the shell or body 3 is a thermo-expansible member as 4 which differs somewhat from that of the patent, consisting as shown, of a hollow or tubular cylinder. Said tubular cylinder or thermo-expansible member 3 is sustained by a support as 5 which does not find its equivalent in my said prior patent. This support 5 is practically in the form of a disk perforated if necessary and as illustrated, for lightness and which is disposed comparatively closely within the base 2. This support or perforated disk 5 is furnished with an upstanding stud as 6 which is associated therewith in a novel manner. Said stud or pin 6 is shown as provided at its lower end with a flange or foot 7 which abuts against the underside of the support or disk 5 and it is held in operative relation with the support in an advantageous way. Initially the stud or pin 6 will be passed through the central perforation of the support or disk 6 until the flange or foot 7 abuts against the under surface thereof as shown for example in Fig. 5 and also in Figs. 6 and 7. It is held in place as I will now set forth. With the aid of a shaving tool as 8 or in some other proper way (Figs. 6 and 7) the external portion of the stud or pin is shaved or skimmed off and pressed firmly against the upper surface of the support of disk 5 as at 6' thus providing a stop or shoulder to secure the pin properly in position. The thermo-expansible member or tube 4 as will be clear rests on the support or disk 5 and the stud or pin 6 extends into the lower portion of the bore through said part 4 and properly positions said part 4 for its functioning.

In the shell or body 3 is a regulating member as 9. It will be remembered that in my prior patent, there is a regulating member; this, however, differs somewhat from that used herein, and which I have designated by 9. The regulating member 9 is in the form practically of a tube open at its lower end and closed as at 10 in a substantially spherical manner at its upper end. The regulating member almost wholly incloses the thermo-expansible member or tube 4 yet the two parts are laterally separated by a fairly considerable interval, relatively speaking. As a matter of fact the lower edge of the part 9 extends almost to the lower end of the part 4. With the regulating member 9 is coöperative a valve as 11. It is not necessary for me to indicate how this valve operates for the invention does not concern this feature but resides rather in the way in which the valve is associated with the regulating member.

The upper closed end of the said regulating member 9 has a central perforation through which projects the stem or shank 12 at the lower end or constituting a downward continuation of the valve, means being provided to hold this stem in solid connection with the regulating member as I will now explain. Said stem 12 is provided with an exterior shoulder or collar 13. The stem 12 is passed through the central perforation at the upper end of the regulating member, from the upper side thereof until the collar 13 abuts against the concaved upper side of the regulating member. When this is done the lower end portion of the stem will be shaved or skinned in virtually the exact manner already described, and the stock or material thus shaved off will be pressed as at 12' against the concaved under side of the top of the regulating member to thus provide a stop and maintain the stem 12, or the valve 11 in proper connection with the regulating member.

These are merely two of the several ways in which the invention can be carried into effect and in both cases they add much to the value of the valve.

What I claim is:

1. A device of the class described comprising a base, a shell associated with the base, a tube in the shell, closed at an end, and a valve for controlling the discharge from the shell, having a stem extending through the closed end of the tube, the stem having an external shoulder fitted against one surface of said closed end, the stem being also skinned to fit against the opposite surface of said closed end.

2. A device of the class described comprising a base, a shell associated with the base, a tube in the shell closed at its upper end, a valve for controlling the discharge from the shell, connected with the closed end of the tube, a support in the base, a stud extending through the support and provided with a flange bearing against one surface of the support, the stud being skinned to engage the opposite surface of the support, and a thermo-expansible member in the tube, resting on the support, receiving said stud and sustaining the closed end of the tube.

3. An element for use in an air-valve device, having a part extended through it, a portion of the extending part having a rigid portion fitted substantially against one surface of the element, and the extending part being also shaved to fit against the other surface of the element to hold the extending part in rigid relation with the element.

In testimony whereof I affix my signature in the presence of two witnesses.

ALLAN J. BEATON.

Witnesses:
BERTHA A. MACRISTY,
HEATH SUTHERLAND.